Sept. 22, 1953 M. R. WARREN 2,652,613
BUILDING BLOCK MOLDING MACHINE
Filed July 23, 1947 12 Sheets-Sheet 1

Inventor
Millard R. Warren
By
Albert H. Kirchner
Attorney

Sept. 22, 1953    M. R. WARREN    2,652,613
BUILDING BLOCK MOLDING MACHINE
Filed July 23, 1947    12 Sheets-Sheet 3

Inventor
Millard R. Warren
By Albert H. Kirchner
Attorney

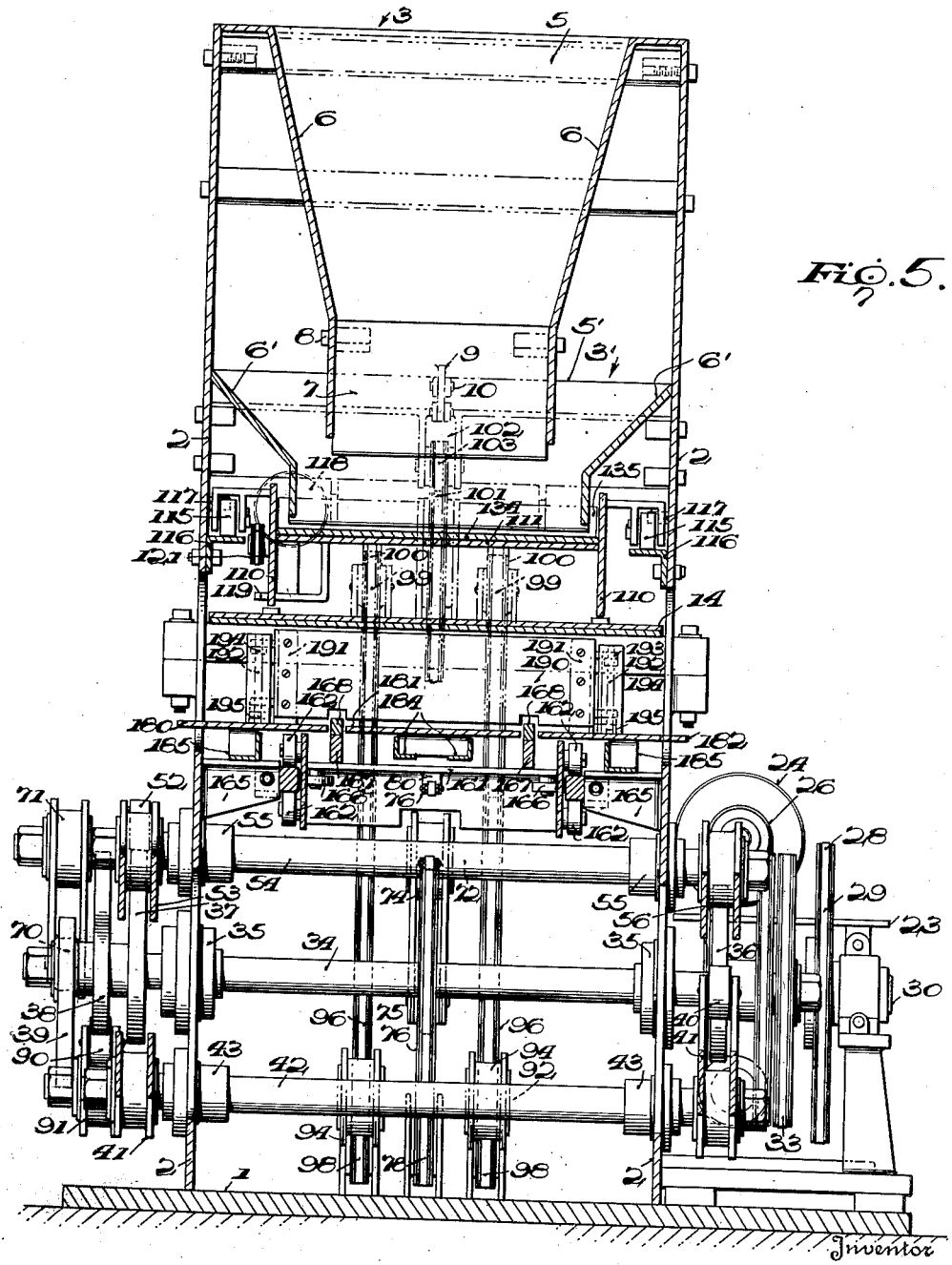

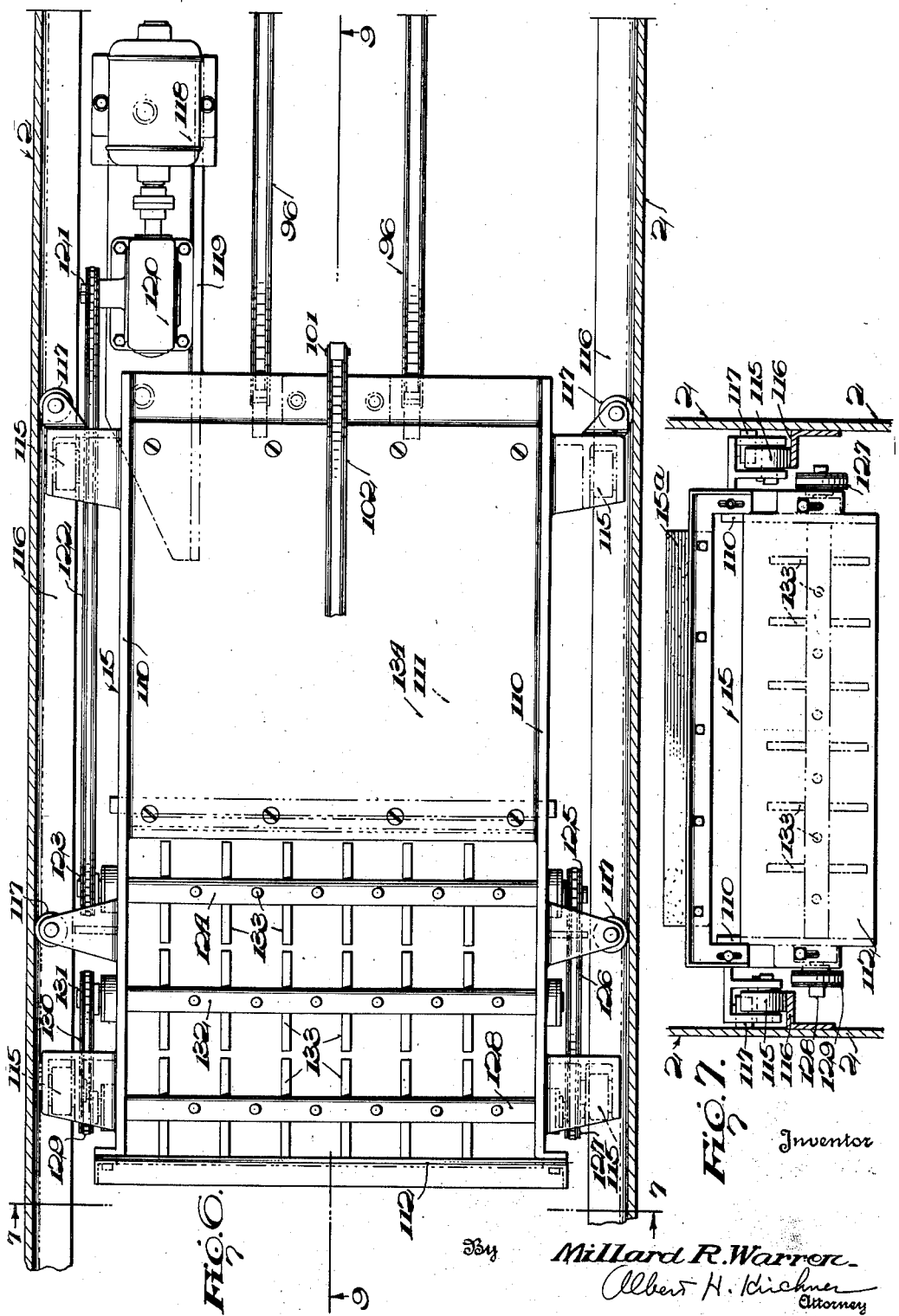

Sept. 22, 1953  M. R. WARREN  2,652,613
BUILDING BLOCK MOLDING MACHINE
Filed July 23, 1947  12 Sheets-Sheet 7
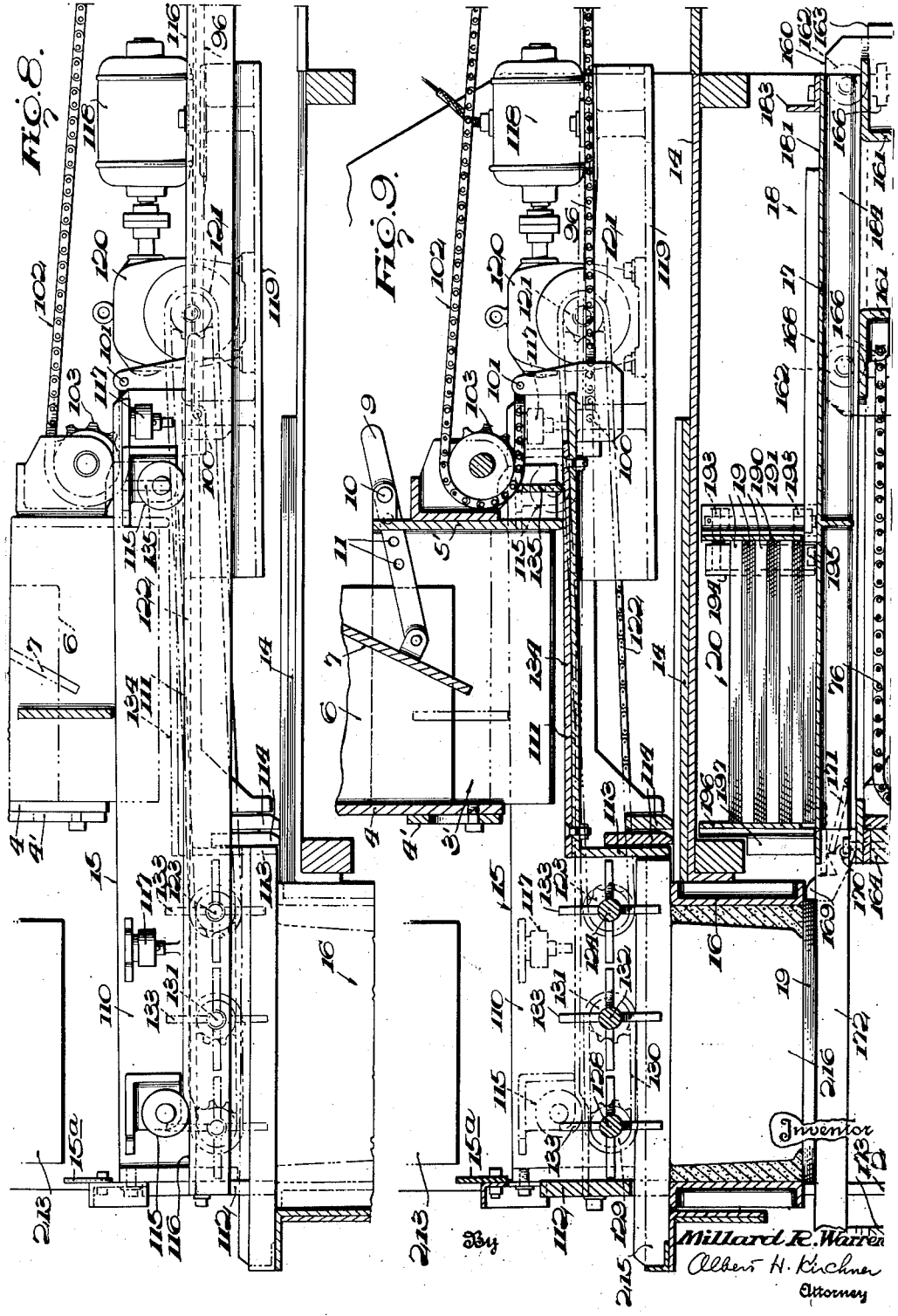

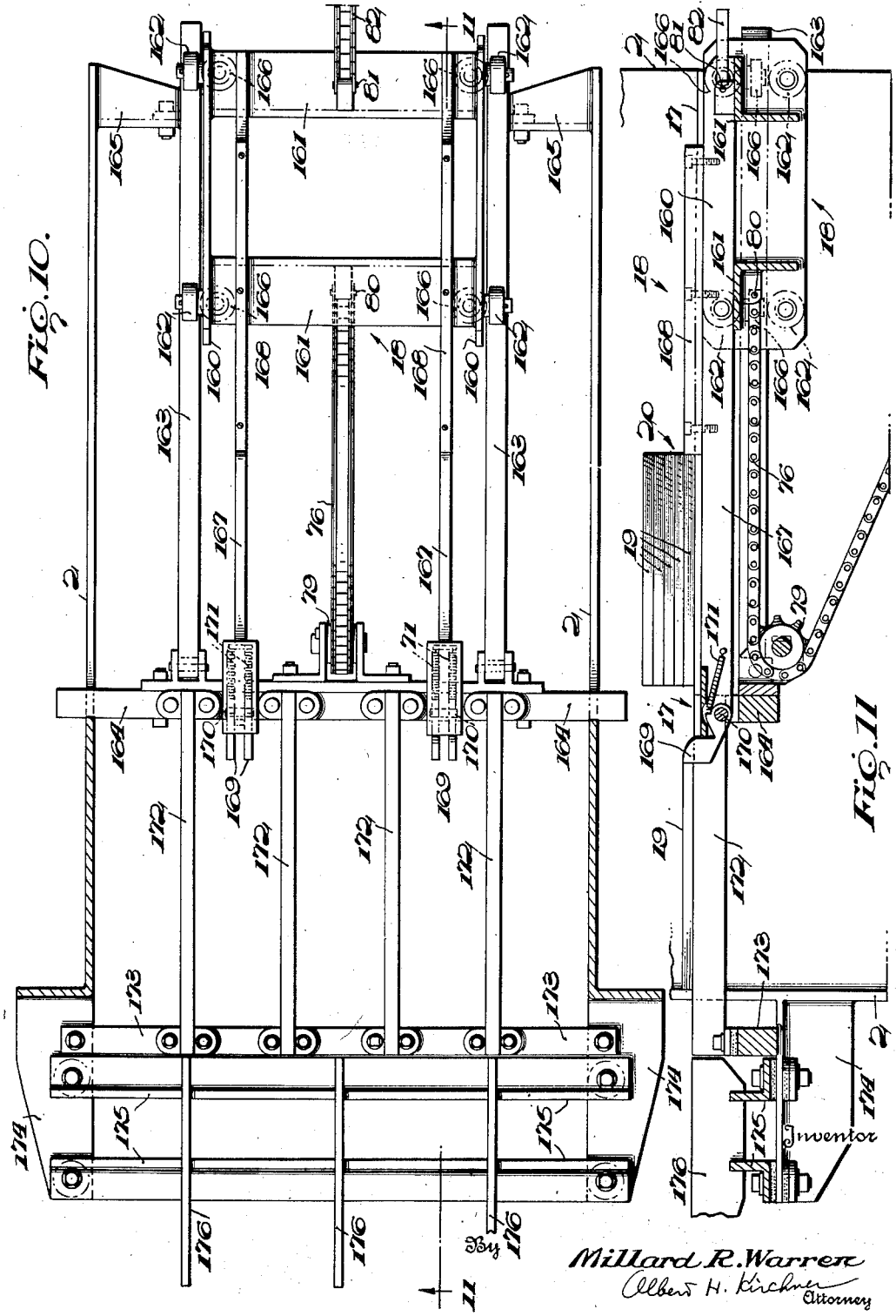

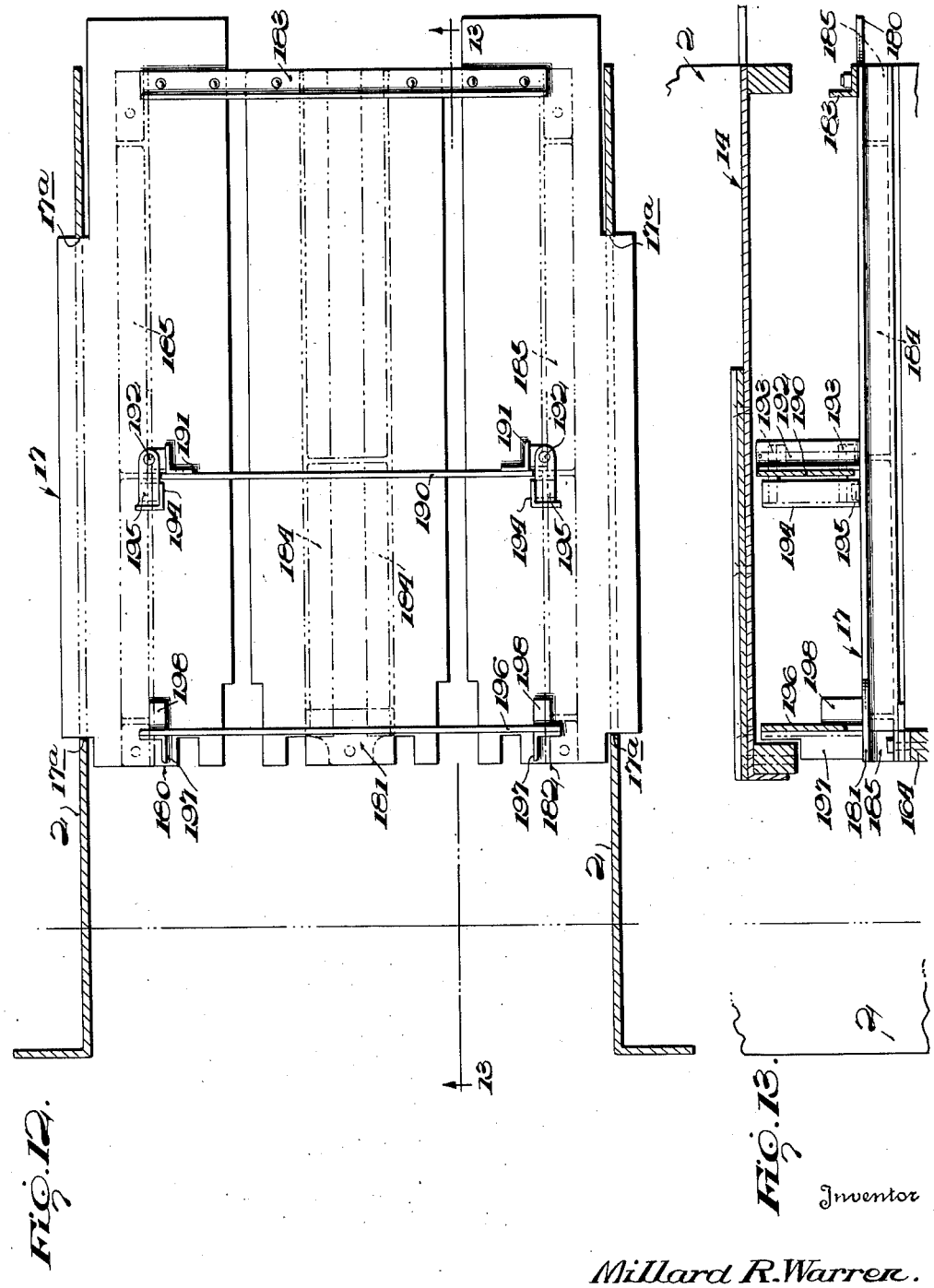

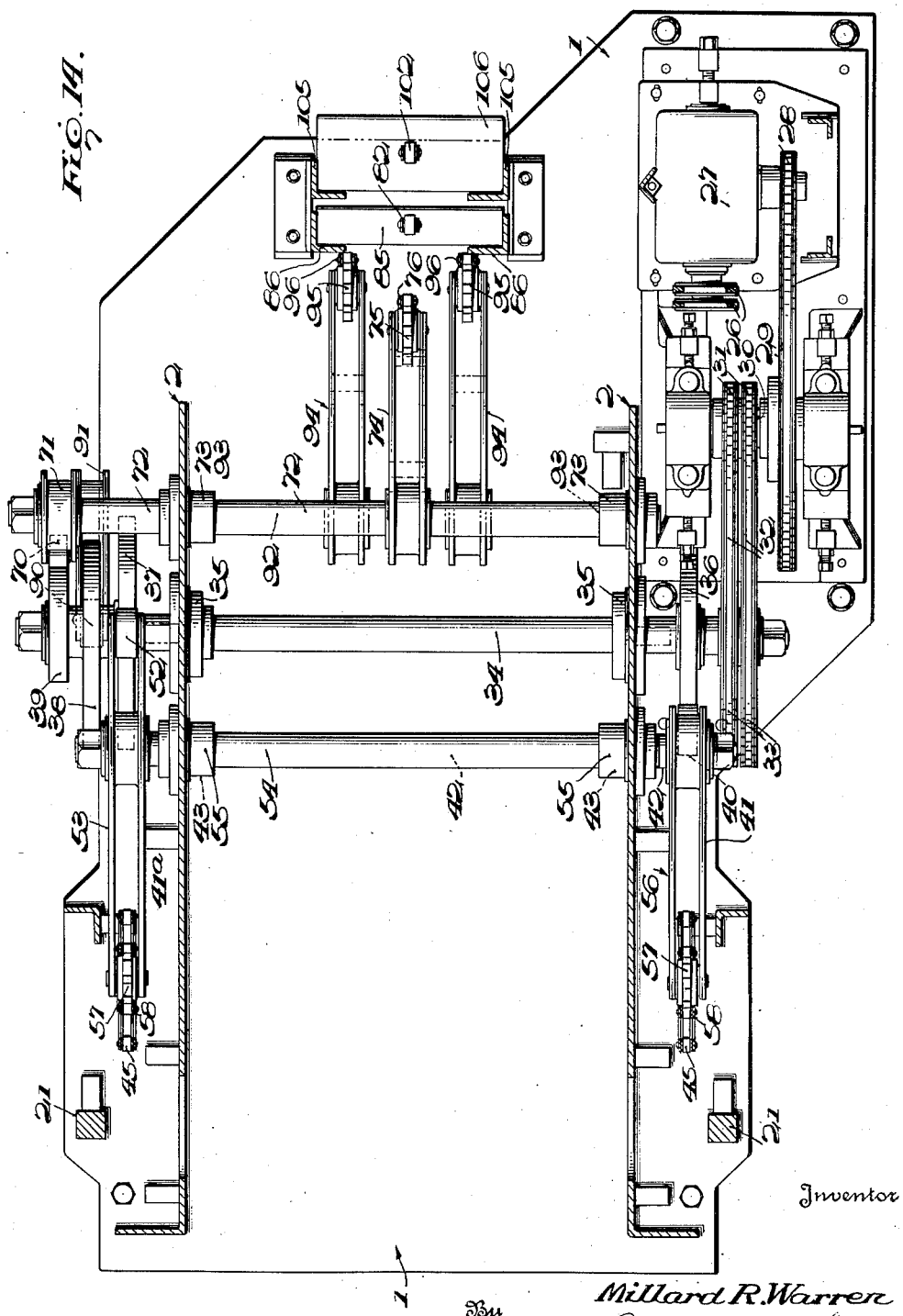

Sept. 22, 1953   M. R. WARREN   2,652,613
BUILDING BLOCK MOLDING MACHINE
Filed July 23, 1947   12 Sheets-Sheet 11
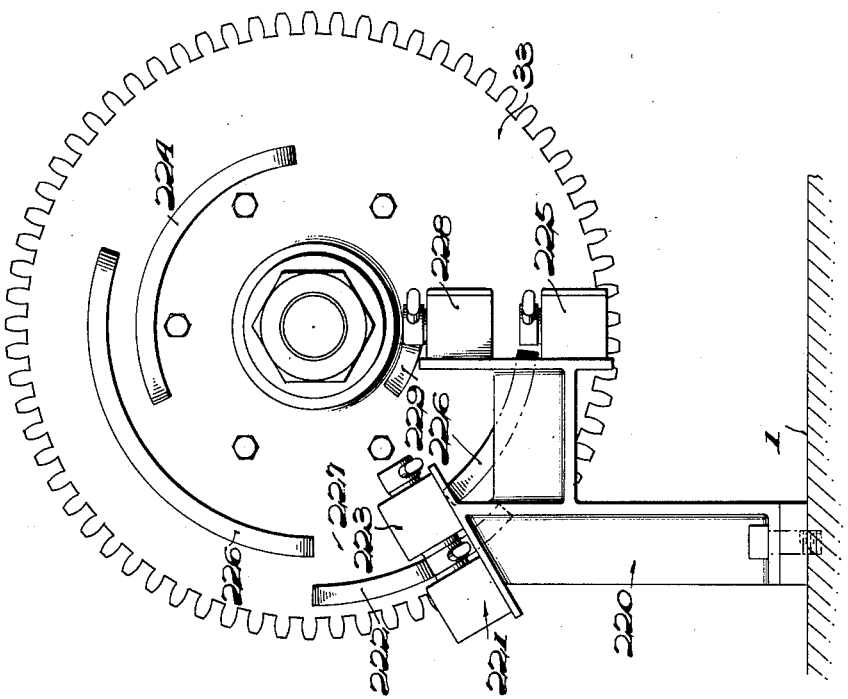
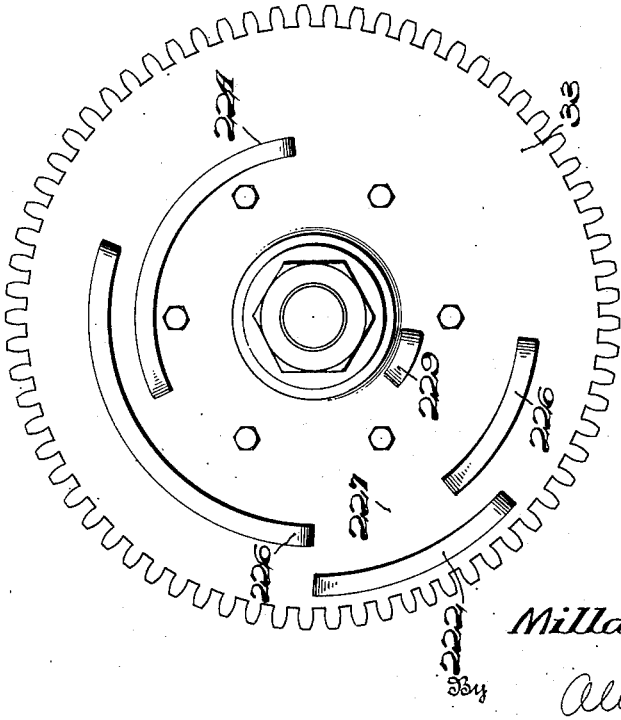
Inventor
Millard R. Warren
By Albert H. Kirchner
Attorney Sept. 22, 1953     M. R. WARREN     2,652,613
BUILDING BLOCK MOLDING MACHINE
Filed July 23, 1947                12 Sheets-Sheet 12
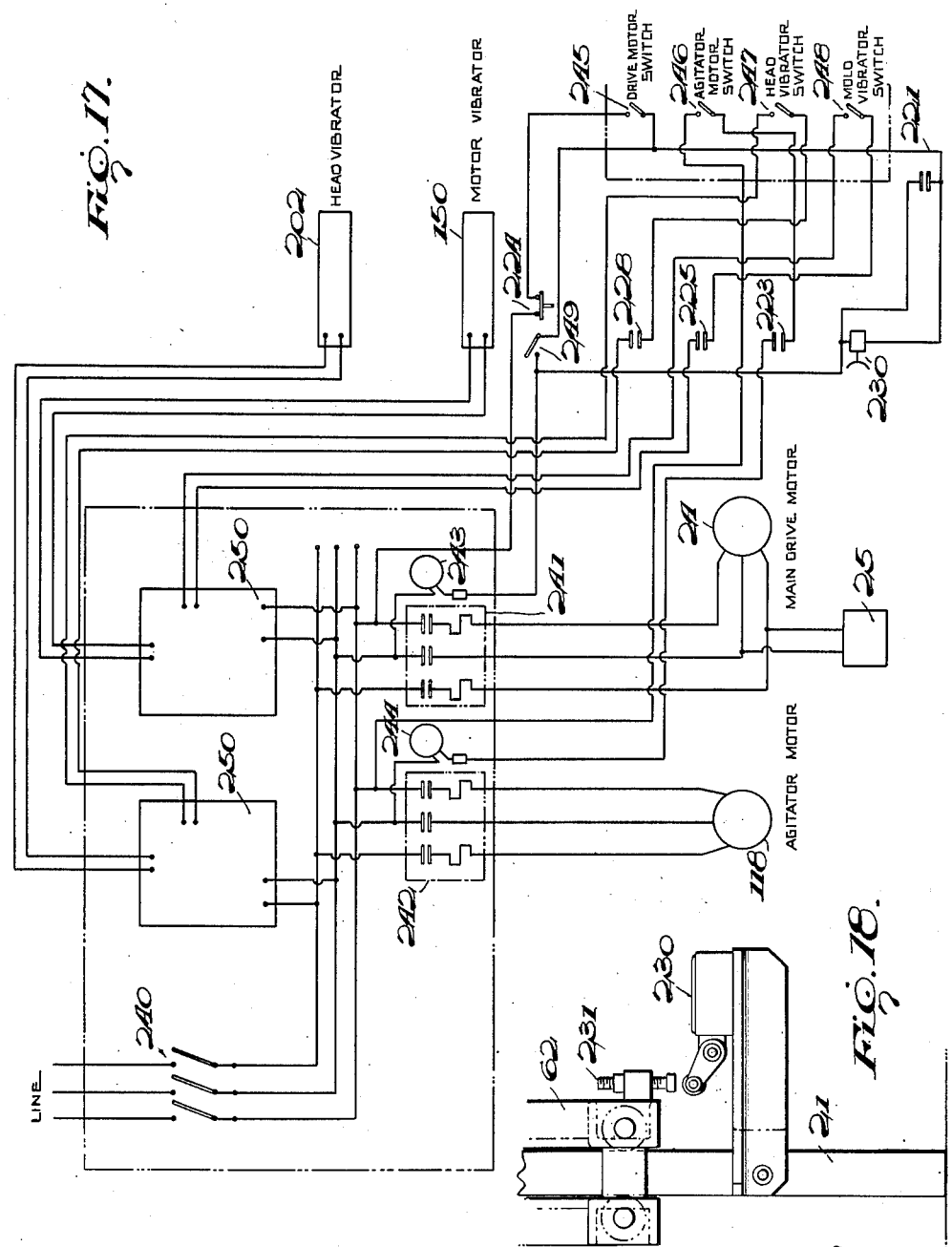
Inventor
Millard R. Warren
By Albert H. Kirchner
Attorney Patented Sept. 22, 1953

2,652,613

UNITED STATES PATENT OFFICE 2,652,613

BUILDING BLOCK MOLDING MACHINE

Millard R. Warren, Knoxville, Tenn.

Application July 23, 1947, Serial No. 763,011

11 Claims. (Cl. 25—41)

The present invention relates to concrete block molding and provides a complete and fully automatic machine for rapidly producing building blocks or the like in accurately predetermined size from any suitable mix such, for example, as Portland cement and appropriate aggregate.

The machine includes a hopper for receiving quantities of plastic mix, a reciprocating box or drawer for periodically taking a measured quantity of mix from the hopper, and a mold to which the box delivers its charge. Included also are mechanism for supplying pallets singly and successively to the mold to serve as supports for the castings, means for vibrating both the mold and a cooperating head so as to compact the mix and thereby make the blocks dense and strong, and means for stripping the mold and delivering the finished blocks when and only when the mix has been sufficiently vibrated to be reduced to predetermined size. The machine is entirely cyclic in operation, the parts being all restored to their initial relative positions upon the completion of each casting operation, for automatic repetition of the cycle.

Among the principal objects and advantages of the machine and the process according to which it operates are the following:

1. In its reciprocating movement between the hopper and the mold the mix box moves toward the mold while the mold is stationary and not vibrating, and the mix box comes into direct contact with the mold before vibration begins, after which vibration of the mold begins and is communicated to the mix box to assist in discharging its load into the mold.

2. The initial vibration of the mold, communicated to the engaged mix box, is of very short duration but is effective to fill all portions of the mold completely and uniformly. Vibration is interrupted while the mix box is being withdrawn from the mold to its original position beneath the hopper and while the mold head with its hold down feet is being lowered onto the mold, whereupon vibration of the mold is resumed and vibration of the head begins. By this procedure and sequence the mix is distributed uniformly in the mold and the final vibration produces a casting which is uniformly compacted.

3. With the mold and head vibrating simultaneously, the head settles to a predetermined level or depth in the mold while all other parts of the machine, such as the several feeding and discharging parts, are held motionless. In this way premature discharge of an incomplete block, or of an improperly or insufficiently compacted block, is prevented, and no new block can be started in production until the immediately previous block is perfectly finished.

4. Stripping of the mold, by elevating its side walls while the head remains down in position on the casting, begins just before vibration of the mold ceases, so that parting of the mold from the casting is materially aided, and sticking is prevented, by the effect of the vibration.

5. The head is stabilized in its movement down into the mold so that the head, in its contact with the top of the casting, preserves a constantly accurate level, thus insuring the production of a block of equal height or thickness at each of its sides and corners.

6. The mold and head are both positively vibrated, preferably in opposite phase, so that an enhanced impact effect of mold and head advancing toward each other is obtained.

7. A wiper is arranged to clean the head of any mix tending to adhere to it after each casting operation. Such adhering particles are wiped into the mix box to become part of the next charge, and a clean head is presented to the ensuing casting operation.

8. The pallets bearing the newly cast blocks are advanced from beneath the elevated, stripped mold quickly to a delivery shelf by a motion that accelerates and decelerates slowly, thus avoiding the danger of damaging the relatively soft blocks by the shock of sudden inertia forces.

9. The mix box is provided with agitating means to move the mix forwardly in the box as the box advances toward discharging position over the mold, thus preventing spilling of the mix over the rear wall of the forwardly moving box.

10. The mix box agitating means insures discharge of the mix into the hollows in the mold between the mold walls and cores, however narrow or thin these hollows may be, and prevents the mix collecting on the cores and core bars.

11. The mix box is advanced from the hopper to the mold by the force of a counterweight rather than by direct application of a power drive. Such advancing force is yieldable and will be stopped by a sufficient obstruction with the result that the machine will be stalled until the obstruction is removed and no part of the machine will be forced by dangerous stresses that might result in breakage or other damage.

12. Vibration is interrupted while the newly made blocks are being delivered to the shelf bars for removal, and these bars are cushioned against transmitted vibrations so that the blocks are protected in the event that they are not removed from the shelf bars before vibration is resumed in the production of the next set of blocks.

13. The mix is supplied from overhead and the pallets are fed from a side of a machine, rather than from an end, from which it results that the machine and the appurtenances which supply it and keep it in operation occupy a surprisingly small amount of space.

14. The supply of mix is fed to the mix box through a nested pair of hoppers for preventing spilling.

15. The respective vibrator drives are each connected directly to the head and mold and are insulated or cushioned from the other adjacent parts of the machine so that the full vibrating force is concentrated on the head and mold and the rest of the machine is protected from wear and damage.

16. The machine is comparatively simple, considering the manifold functions which it performs, and is ruggedly constructed with a minimum of working parts all arranged to be readily accessible for repair and replacement and all assembled for efficient and trouble-free operation over a long period of time.

17. The machine is largely built of standard metal stock, such as plates, channels, angles, gears, chains, shafts, etc., and is arranged for electric power drive by conventional motors and for electric control by standard types of switches and other parts that are readily and economically available.

With the foregoing and other objects and advantages intended, the present specification will now proceed to describe a single particular embodiment of the invention which has been actually built and successfully operated with complete satisfaction and which is therefore now preferred. This machine, which produces standard concrete building blocks, three at a time, at the rate of eight to nine hundred per hour, is to be considered a typical and exemplary embodiment of the chief principles of the invention, but these principles may be incorporated in other and different machines and parts of machines, as pointed out by the appended claims, and not all of these principles need be used conjointly or in the precise forms and combinations herein shown and described.

This preferred complete embodiment of the invention is depicted in the accompanying drawings, in which Figure 1 is a side elevation;

Fig. 5 is a vertical cross section on the line 5—5 of Fig. 1;

Fig. 6 is a plan of the mix box and its associated parts;

Fig. 7 is a front elevation of the mix box on the line 7—7 of Fig. 6;

Fig. 8 is a side elevation of the mix box;

Fig. 9 is a vertical longitudinal section of the mix box on the line 9—9 of Fig. 6;

Fig. 10 is a plan of the pallet feed mechanism;

Fig. 11 is a vertical longitudinal section of the pallet feed mechanism on the line 11—11 of Fig. 10;

Fig. 12 is a plan of the pallet table with the pallet feed mechanism removed;

Fig. 13 is a vertical longitudinal section of the pallet table on the line 13—13 of Fig. 12;

Fig. 14 is a plan of the cam shaft and rocker arms;

Fig. 15 is an elevation of the gear wheel with its operating devices for certain electrical switches;

Fig. 16 is an elevation of the gear wheel and the switches which it operates;

Fig. 17 is a diagram of the electrical circuits which control the operation of the machine; and Fig. 18 is an elevation of another of the switches and its operating means.

Figure 1:
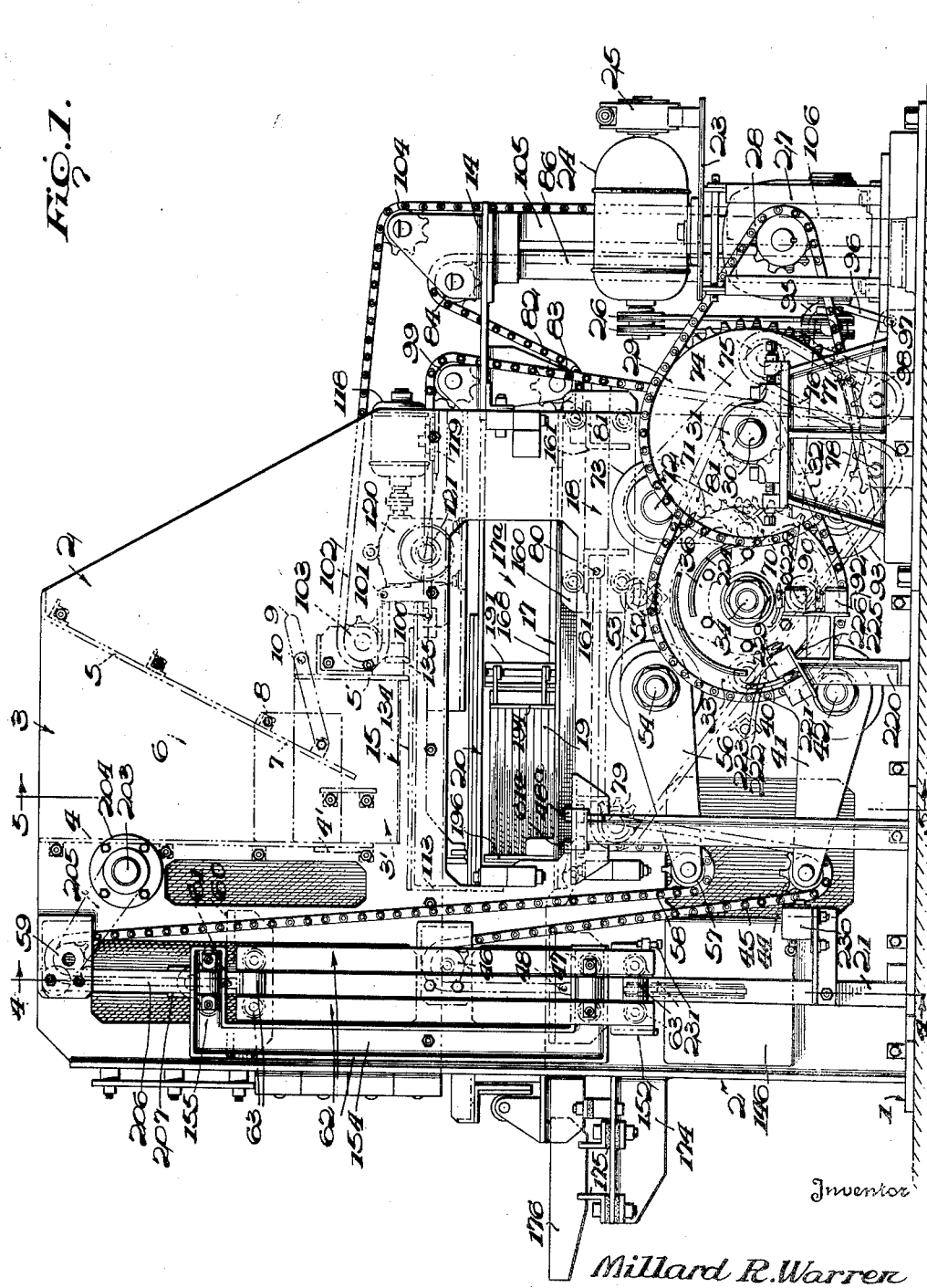

The machine is made of heavy metal stock and comprises at its bottom a base plate 1 to which are secured vertical side plates 2, 2 rising at opposite sides of the structure. A primary hopper 3 for admission of a plastic cementitious mix is formed in the upper zone of the machine by a front vertical plate 4, a forwardly sloping rear plate 5, and a pair of inwardly converging side plates 6, 6 (Fig. 5). To regulate the delivery rate of the primary hopper, the front plate 4 has a lower extension plate 4' mounted on it for vertical adjustment and the rear plate 5 terminates above the level of the hopper orifice at the bottom of the other plates 4, 6, 6 and the rear of the hopper is continued as a hinged extension plate 7 pivoted at 8 to the rear plate 5 and adapted to be swung and set at different angles by adjusting a handle 9 at any of several positions determined by the setting of a pin 10 in any aligned pair of a series of holes 11 formed in the handle and in an adjacent stationary part of the framing structure.

Surrounding the lower portion of the primary hopper 3, and receiving mix therefrom, is a secondary hopper 3' which is fixed between the side plates 2, 2 and comprises a pair of side plates 6', 6' having downwardly and inwardly sloping upper portions and vertical lower portions and a vertical rear plate 5'. The front of the secondary hopper is left open.

Extending lengthwise along the machine in spaced relation below the orifice of the secondary hopper 3' is a fixed mix table 14 on which a mix box 15 is adapted to move lengthwise between a position beneath the hopper orifice and a position at the front of the machine directly over a mold 16.

Spaced below the level of the mix table 14 and extending lengthwise of the machine and projecting slightly through high openings 17a in the side plates 2 (see Figs. 1 and 12) is a fixed pallet table 17 along which a pallet feed carriage 18 (Fig. 11) is adapted to be reciprocated fore and aft to supply a pallet 19 from the bottom of a stack 20 (Figs. 1 and 3) forwardly to a position beneath the mold 16, to form the bottom thereof.

At the front of the machine, vertical posts 21 rise from opposite sides of the base plate 1 and define a front frame within which the mold 16 and a head assembly 22 are movable up and down during the controlled cyclic operation of the machine.

In the rear of the machine is a fixed shelf 23 supporting a main electric motor 24 which is equipped with an electric brake 25. This brake is connected in parallel to two of the three A. C. supply lines for the motor and is energized to release when the motor is energized. A spring applies the brake promptly when the motor is de-energized.

The motor 24 is connected by a belt drive 26 to reduction gearing 27 which in turn is connected by a chain drive 28 to a large gear wheel 29. This gear wheel is splined on a jack shaft 30 which drives a pinion 31. This in turn, by a chain 32, drives a main driving gear wheel 33 which is fast on a main cam shaft 34.

The cam shaft 34 is journalled in bearings 35 mounted in the frame side plates 2 and carries at one end, outwardly of the adjacent side plate 2, a mold operating cam 36. At its opposite end, outwardly of the other frame side plate 2, the cam shaft 34 carries a head raising cam 37, a mix box retracting cam 38, and a pallet feed carriage advancing cam 39, all fast on the shaft 34 and located in the named order outwardly toward the end of the shaft.

A cam follower roller 40 bears against the cam 36 and is carried at one end of a rocker arm 41 which is fast on a shaft 42 which is journalled in bearings 43 mounted in the two side frame plates 2. The other end of this rocker arm is provided with a sprocket 44 meshed with a chain 45 which passes over an idler 46 and terminates at a mold bracket 47 to which it is made fast at a point 48.

Bearing against the head raising cam 37 is the roller 52 at one end of a rocker arm 53 which extends from a shaft 54, located vertically above the shaft 42 and journalled in bearings 55 mounted in the two side frame plates 2. This shaft 54 extends through both of the side frame plates 2, and its end opposite to that which carries the rocker arm 53 is provided with a fixed arm 56 the outer end of which carries a sprocket 57 meshed with a chain 58 which passes up and around an idler 59 and is made fast to the head bracket 60, at the point 61.

The two head brackets 60 have welded to them a U-shaped yoke 62, the horizontal arms of which carry rollers 63 which run vertically along the posts 21 for guiding the head in its up and down movement.

Bearing against the pallet feed carriage advancing cam 39 is a roller 70 carried by a rocker arm 71 which is fast on a shaft 72 which is journalled in bearings 73 mounted in the two side frame plates 2. This shaft 72 has at its center point an arm 74 the free end of which carries a sprocket 75 meshed with a chain 76 which is anchored at 77 to the base plate 1. This chain passes over an idler 78, then forwardly and upwardly over an idler 79, and has its end made fast at 80 to the pallet feed carriage 18.

From an anchorage point 81 on the pallet feed carriage 18 a chain 82 passes over an idler 83 and thence upwardly over an idler 84 to a counterweight 85 which is mounted for vertical movement in a guide frame 86.

Bearing against the mix box retracting cam 38 is a roller 90 carried by a rocker 91 which is fast on a shaft 92 directly below the shaft 72 and is journalled in bearings 93 mounted in the side frame plates 2. A pair of rocker arms 94 extend rearwardly from the shaft 92 and each carries a sprocket 95 with which is meshed a chain 96 anchored at 97 to the base plate 1. Each of these chains 96 passes over an idler 98 and thence up over an idler 99 on the table 14, and its free end is anchored at 100 to the mix box 15.

Anchored at 101 to this mix box is one end of a chain 102 which passes over an idler 103 mounted on the secondary hopper 3' and thence back over an idler 104 on a guide frame 105 to terminate in a counterweight 106 which is guided for up and down movement in the frame 105.

The mix box 15, which is shown in detail in Figs. 6, 7, 8 and 9, comprises a pair of side frames 110 which are connected at their tops across substantially their rear halves by a trailing skirt plate 111 and across their forward ends by a front plate 112 and, in spaced relation behind this front plate 112, by a rear plate 113 which may take the form of a turned down extension of the skirt plate 111. The four surfaces provided by the facing walls of the plates 112 and 113 and the interposed side frames 110 form a bottomless and topless rectangular drawer which constitutes the mix box proper and receives the mix from the secondary hopper 3' for moving such mix forwardly from the hopper to discharge it into the mold 16. The front plate 112 has bolted to it, projecting above its top, a wiper blade 15a for scraping clean the bottom surface of the head, as hereinafter explained.

The plate 111 extends rearwardly as a skirt or apron from the mix box proper for closing the bottom of the hopper orifice when the mix box proper is moved forwardly. The mix box is pulled forwardly by the chain 102 and rearwardly by the chains 96, along the mix table 14, and this table is wiped clean by drag bars 114 which are best shown in Figs. 8 and 9. These comprise a fixed bar spaced behind the plate 113, and a floating bar interposed between the plate and the fixed bar.

The mix box is guided in its movements by rollers 115 bracketed on the side frames 110 to roll along rails 116 which are bolted directly to the side frame plates 2, and by rollers 117 which are bracketed to the side frames 110 to turn on vertical axes and roll in direct contact with the side frame plates 2.

As is best shown in Figs. 8 and 9, the front ends of the rails 116 are depressed sufficiently to lower the mix box 15, at the forward limit of its movement, to bring its side frames 110 down into direct engagement with the top of the mold 16, so that vibration of the mold, as hereinafter explained, is directly communicated to the superposed mix box to assist in discharging the mix box. This, as has been stated, is regarded as an important feature of the invention.

An electric motor 118 (hereinafter called the agitator motor) is mounted on a bracket 119 which extends from the rear of the trailing skirt plate 111 and is directly coupled to reduction gearing 120 which is provided with a sprocket 121 driving a chain 122 meshed with a sprocket 123 fast on a shaft 124 which extends transversely through the rear portion of the mix box proper, being journalled in bearings mounted on the outside of each of the mix box side frames 110. A sprocket 125 is fast on the opposite end of this shaft 124 and is connected by a chain 126 to the similar sprocket 127 on a shaft 128 which is journalled at the forward portions of the side frames 110 and extends through the front portion of the mix box proper. This shaft 128 carries a sprocket 129 at its opposite end, outside the mix box and beyond its bearing. A chain 130 is carried by the sprocket 129 and drives the sprocket 131 of an intermediate shaft 132 which extends through the middle of the mix box proper and is similarly journalled therein. Each of the shafts 124, 128 and 132 is provided with fixed radially projecting tines or arms 133 which agitate the contents of the mix box when the three shafts are rotated in response to energization of the motor 118.

Figure 2:
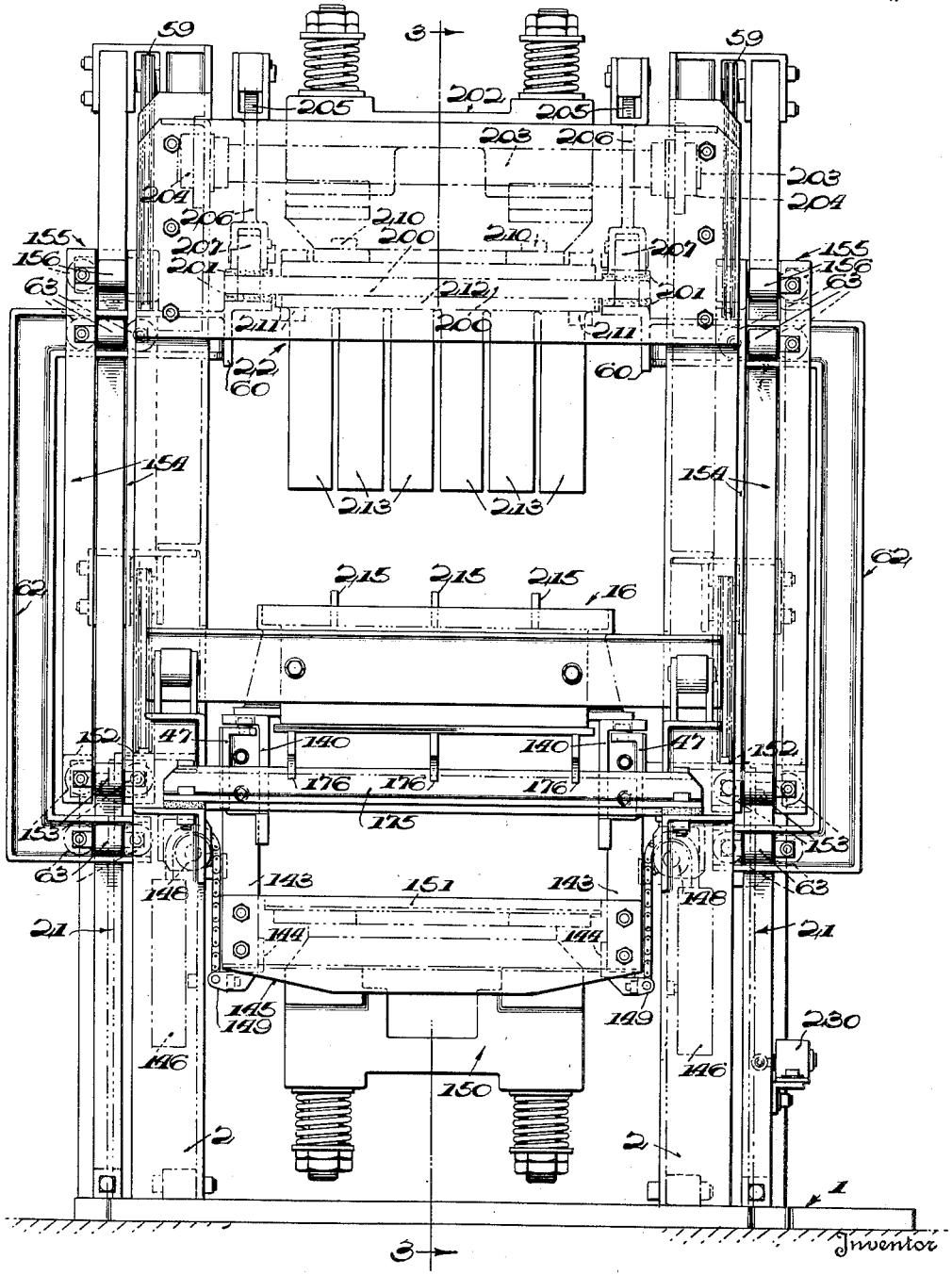
Fig. 2 is a front elevation.
Figure 4:
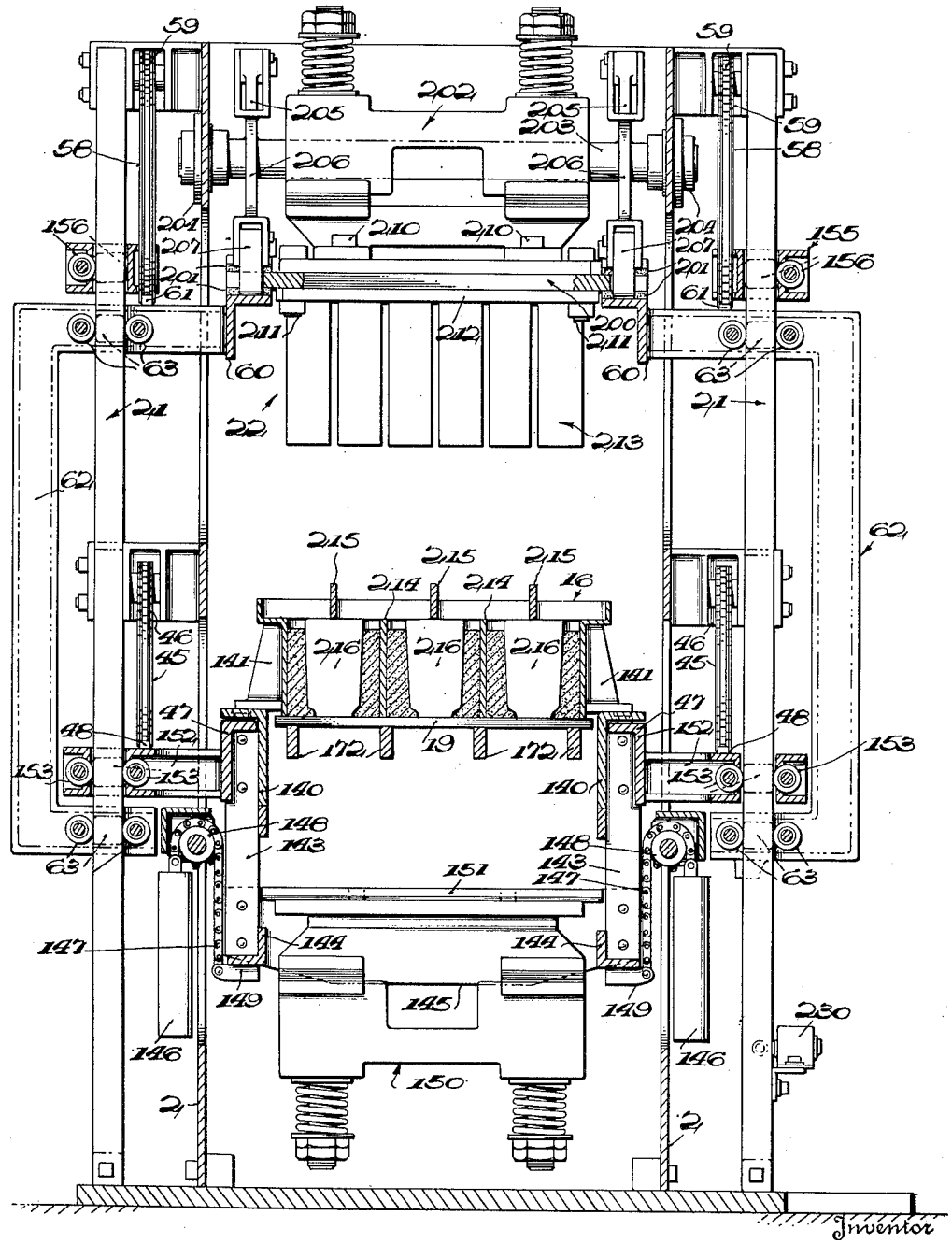
Fig. 4 is a vertical cross section on the line 4—4 of Fig. 1.

It will be noted that the arrangement is such that all the shafts 124, 128 and 132 turn in the same direction, and that the tines or arms 133 turn forwardly in the lower half of the circle they describe. This has the effect of moving the mix to the front of the box and overcoming the tendency of the mix to collect in the rear of the box. These tines or arms 133 are spaced lengthwise along their respective shafts in such a way as to clear any core bars, e. g., those shown at 215 in Figs. 2 and 4, that may be used in the mold 16. The tines are best mounted in the shafts for ready removability and replacement required by wear or bending. One convenient mounting arrangement consists in setting a cotter pin through registering holes in the shaft and in the center of each tine.

Figure 3:
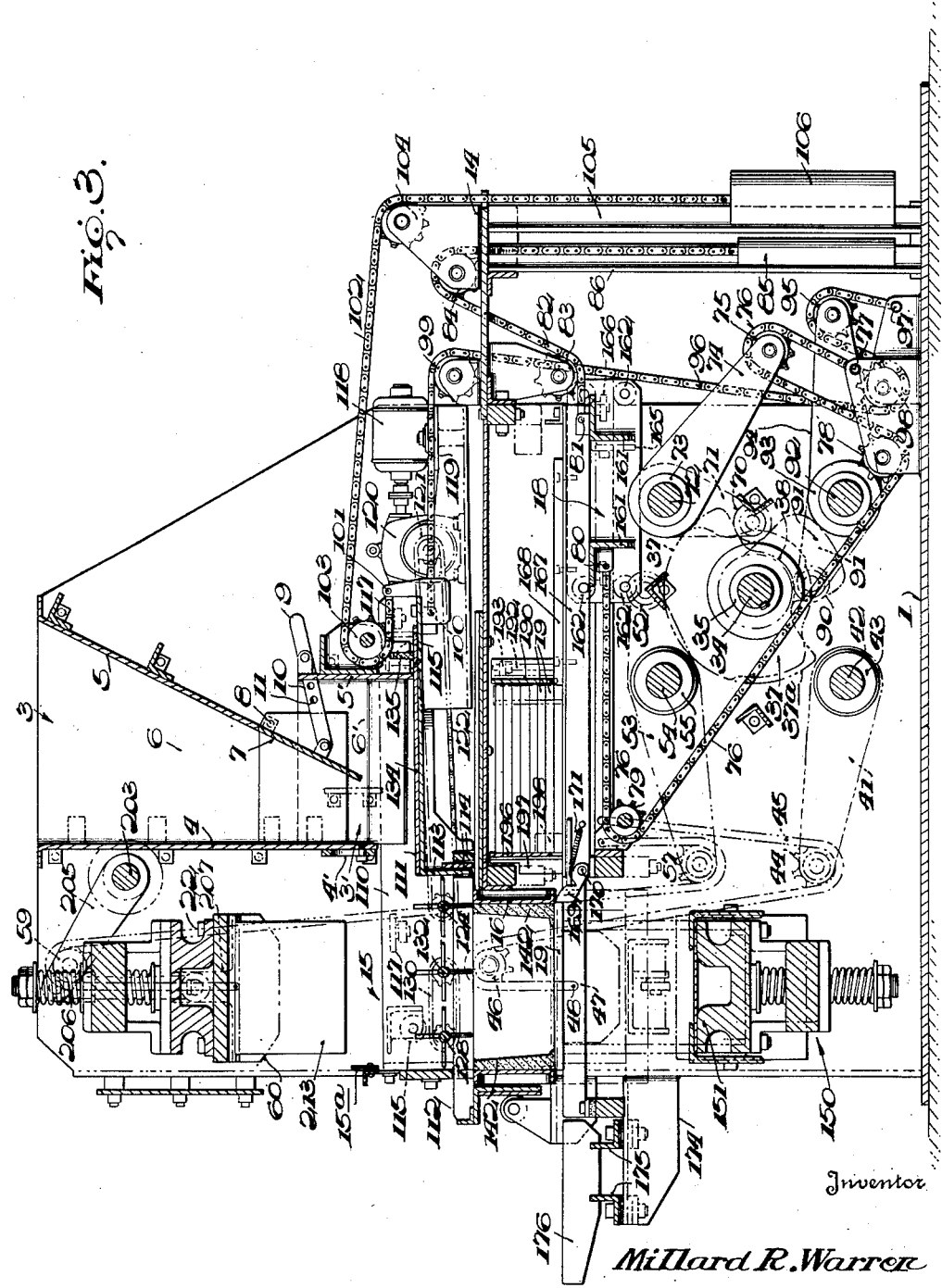
Fig. 3 is a vertical central longitudinal section on the line 3—3 of Fig. 2.

It is convenient to provide a wear plate 134 on the plate 111 to cooperate with and take wear from a drag bar 135 which depends from the secondary hopper 3', as shown in Fig. 3.

The mold 16 is provided at each side with a depending bracket 140, each of which is bolted to the adjacent bracket 47 with a rubber gasket interposed between them. Surmounting each of the brackets 140 and welded or otherwise secured to them is a mold side plate 141, the opposite ends of which are connected by front and back plates 142, so that the mold cavity is defined by the rectangular opening between the four plates 141, 141, 142 and 142.

Four posts or legs 143 depend at the four corners of the mold from the brackets 140 and 47, and brackets 144 connect the bottoms of each of the two legs on one side of the mold. Front and rear plates 145 connect each pair of legs at the front and rear respectively of the mold. At each side of the mold a counterweight 146 is suspended by a chain 147 which passes up over a sprocket 148 journalled in the adjacent side frame plate 2, and each of these chains is fastened at its opposite end to a fitting 149 which is fixed to the adjacent bracket 144.

A vibrator assembly 150, which may be of the electrically operated type shown in the drawings and hereinafter described, is bolted to the bottom of a vibrator plate 151 which is welded at its front and rear edges to the front and rear plates 145, so that the mold 16 is vibrated in response to operation of the vibrator assembly.

Extending from the side of each bracket 47 is a horizontal arm 152 of one of the U-shaped members 62 which carries a cluster of four rollers 153 which run along the four faces of the post 21, and the vertical element of this member 62, which is designated 154, extends upwardly along the post 21 and has its end turned inwardly at 155 and mounting four similar rollers 156 which ride along the post 21. This arrangement guides the entire mold and vibrator assembly in its reciprocating movement up and down in response to pull on the chains 45 or action of the counterweights 146.

The pallet feed carriage 18, as best shown in Figs. 10, 11, 12 and 13, comprises a pair of side plates 160 connected at their front and rear by two angles 161 mounting rollers 162 having horizontal axes for riding on rails 163 which at their front ends are mounted on a cross sill 164 connecting the two side frame plates 2. Brackets 165 secure the rear ends of the rails 163 to the side frame plates 2, and rollers 166 having vertical axes are mounted on the side plates 160 to ride against the sides of the rails 163. In this way the carriage 160 is guided in its fore and aft movements along the pallet table 17 in response to pull of the chains 82 and 76.

Two bars 167 project forwardly, in laterally spaced relation, from the carriage 18, being welded to the top flanges of the angles 161, and a pusher bar 168 is bolted to the top rear portion of each of these bars 167. A pair of dogs 169 are pivoted at 170 to the forward end of each of the bars 167 and are normally retracted by the springs 171 to the positions shown in Figs. 10 and 11, in which positions the forward ends of the dogs present low, forwardly facing shoulders, projecting above the level of the pallet table 17 just high enough to engage the pallet 19 which carries the finished blocks and push this pallet from its position under the mold 16 onto the delivery shelf 176 when the carriage 18 has been retracted enough to bring the dogs behind the pallet which underlies the mold 16.

The pallets rest on fixed support bars or anvils 172 which are supported at their front ends by a cross sill 173 which in turn is mounted on an angle bracket 174 welded to the side frame plates 2. Angles 175 are mounted on this bracket 174 and support the delivery shelf 176, the top surface of which lies in the same plane as the tops of the anvil bars 172, so that a pallet 19 can be pushed in a single horizontal plane from the bottom of the stack 20 forwardly onto the shelf 176.

The pallet table 17 comprises three plates 180, 181 and 182, all aligned in the same horizontal plane. These plates are supported at their front edges on the sill 164 and at their rear they are bolted to an angle iron 183. The side plates 180 and 182 project slightly through openings formed in the frame side plates 2, as shown in Fig. 12, and the plates 180 and 182 are both separated from the intermediate plate 181 by comparatively narrow spaces which form guides accommodating the pusher bars 168 which project up through these spaces, so that the forward ends of these pusher bars provide shoulders above the pallet table for engaging the bottommost pallet 19 of the stack 20 so as to push this pallet forward to a position under the mold when the pallet feed carriage moves forward.

Below the center plate 181 are two angles 184 which extend the length of the plate to support and stiffen it, and similar angles 185 are provided below the plates 180 and 182 for the same purpose.

A vertical plate 190 defines the rear of the pallet stack 20 and angle iron uprights 191 secure this plate 190 to the pallet table 17. Lugs on this angle iron mount a vertical pivot pin 192 which carries a pair of arms 193 projecting from a swinging stop member 194 which, in its lowered position shown in Figs. 12 and 13, bears against a stop lug 195 fixed on each of the plates 180 and 182, so that the member 194 can be swung 90° by first lifting it out of engagement from the lug 195.

A vertical plate 196 defines the front of the stack 20 of pallets 19 and corresponds to the vertical rear plate 190. This front plate 196 is notched or cut out at its bottom sufficiently to pass a single pallet when pushed from the bottom of the stack 20 by the pusher bars 168.

Vertical uprights 197 in the form of angle irons fixed to the plate 196 support this plate on the plates 180 and 182 of the table 17, and guides 198 project from the rear of the plate 196 to assist in positioning the pallets in the stack 20.

The mold head assembly 22 includes a head assembly plate 200 which is secured to the head bracket 60 with interposed rubber cushion strips 201. A vibrator assembly 202, like the vibrator assembly 150 for the mold, is mounted on the top of the plate 200 by means of four removable bolts 210 and is supported for vertical reciprocation between the guide posts 21 by stabilizing means for effectively preventing tilting or canting of the head and vibrator assembly that might cause the same to bind or jam in its movements. This stabilizing means comprises a shaft 203 at each side of the assembly journalled in bearings 204 mounted in the side frame plates 2. Each shaft has an integral stabilizer arm 205 extending from it and having a link 206 pivoted at its free end. Each of these links hangs down and has pivoted to its lower end a post 207 which projects up from the bracket 60, through a recess formed in the plate 200.

It will be appreciated that this stabilizing arrangement prevents tilting to the right or left of the head and its vibrator assembly. Tilting fore and aft is prevented by the guide rollers 63 which are mounted on the yoke 62 and bear against the posts 21.

To the bottom of the plate 200 there is secured by two bolts 211 the top plate 212 of a set of hold down feet 213 which is appropriately configured to correspond to the mold 16 and the type of block which is to be made. In the illustrated embodiment six hold down feet are shown, separated by slots for passing the partitions 214 of a three-block mold and the core bars 215 for the cores 216.

In the illustrated embodiment I have shown electric vibrating assemblies 150 and 202 for the mold and head respectively. These are Syntron vibrators, manufactured by Snytron Company, of Homer City, Pennsylvania. They are A. C. operated and vibrate at a frequency of sixty cycles per second. The two are relatively reversed and vibrate in opposite phase so that they move together simultaneously and apart simultaneously, thus producing high frequency compacting blows on the mix in the mold. In substitution for these electric vibrators I may use fluid operated vibrators, such as Branford pneumatic vibrators manufactured by New Haven Vibrator Company, of New Haven, Connecticut. Of course still other types of vibrating means might be sustituted within the broad principles of the invention.

The movements of the mix box, the pallets, the mold and the head are controlled by the cam mechanisms which have already been described.

The sequence of vibrating the mold and head is controlled by an electrical circuit responsive to switches operated by means mounted on the gear wheel 33 and on the head yoke 62, all of which will now be described.

Mounted on the outer face of the gear wheel 33 are four arcuate bosses, all concentric with the wheel and set at different distances from the center of the wheel. These bosses actuate four switches mounted on arms 220 upstanding from the base plate 1 adjacent to the wheel 33, all as shown in Fig. 16.

These switches comprise a switch 221 which is normally closed to energize the main drive motor 24 but is opened when the switch is contacted by the boss 222. A switch 223 on the gear wheel normally keeps open the circuit to the motor 118 driving the agitators in the mix box but is closed, to drive these agitators, by the arcuate boss 224. A switch 225 on the gear wheel is normally open in the circuit to the mold vibrator 150 but is closed by the arcuate boss 226, which is formed in two parts with an intermediate interruption 227. A switch 228 on the gear wheel is normally open to the head vibrator 202 but is closed by the arcuate boss 229.

A switch 230 mounted on one of the posts 21 near the bottom of the post is normally open to the main drive motor 24 but is closed by an adjustable setscrew 231 which is mounted on the head yoke 62 and engages the switch when the head descends a predetermined extent.

It will be noted by reference to Fig. 17 that the circuit supplying each of the electrically operated devices includes a manual switch, i. e., the switch 245 for the main drive motor 24, the switch 246 for the agitator motor 118, the switch 247 for the head vibrator 202, and the switch 248 for the mold vibrator 150. At the beginning of a period of operation of the machine, all of these manual switches must be closed, and they are kept closed until the end of the period of operation, but they are readily available to the operator for opening in case of any emergency.

The switches 241 and 241 (Fig. 17) to the main drive motor 24 and the agitator motor 118, respectively, are three-pole polyphase starting switches which are normally open and are closed only when the actuating devices 243 and 244, respectively, are energized by application of single phase energy. This arrangement permits the motors to be remotely controlled by the manual switches and by the limit switches heretofore described.

Switch 244 is an auxiliary switch provided to give the operator an absolute cut-off control of the main drive motor 24. Another switch, designated 249, is provided to enable the operator to start the main drive motor in operation without regard to the condition of the normally operative control switches. This is desirable because it may sometime happen that an excess quantity of mix in the mold will keep the head assembly 22 from descending sufficiently to close the switch 230 and start the main motor 24 again in operation. In such event the operator can open the switches 247 and 248 to stop the vibration of the head and mold, and can close the switch 249 to start the motor 24 so as to put the machine back into its cyclic operation, which of course will have the immediate effect of stripping the mold and discharging the casting that by its excessive size interrupted the normal cycle.

The foregoing description covers the principal mechanical fixed and moving parts of the machine and the principal electrical instrumentalities which function during normal operation. Fig. 17 diagrammatically shows the complete electrical circuit, to which reference is made for the entire wiring diagram.

The operation of the machine is as follows:

Assuming that, prior to the beginning of a cycle of operation, the mix box 15 is positioned at the rear of its path of travel, directly under the hopper 3', and is filled with a charge from the hopper, and the mold 16 is in its lowered position, resting on a pallet 19, and the head assembly 22 is in its raised position:

To start the machine in operation, all the manual switches 245, 246, 247 and 248 are closed. The main switch 241 controlling the main drive motor 24 is closed by the energization of actuator 243 through switches 244, 245 and 221, the latter switch being in closed position because, in the assumed position of the parts, it is not contacted by the boss 222.

The cam shaft 34 is rotating. The high part of the cam 38 holds the follower roller 90 of the arm 91 on the shaft 92 to position the arms 94 thereof with their sprockets 95, meshed with chains 96, connecting the anchors 100 on the mix box 15 with the anchors 97 on the base plate 1, so as to overcome the tendency of the counterweight 106 to advance the mix box and hold the mix box in its retracted position. When the follower roller 90 drops to the low part of the cam 38, the counterweight 106 acts to pull the chain 102 to advance the mix box to its position resting directly on the mold.

During advance of the mix box, the switch 223 is closed by the boss 224 to start the agitators, and after the mix box reaches its position resting on the mold 16 switch 225 is closed by boss 226 to start mold vibrator 150 in operation. Continued rotation of the cam shaft 34 turns the cam 38 against the follower roller 90 of rocker arm 91 on shaft 92 to rock the shaft and its arms 94. Thus the sprockets 95 at the free ends of the arms 94 swing upwardly to shorten the chains 96 to raise the counterweight 106 and retract the mix box. During this retraction of the mix box the switch 225 is opened by the interrupted portion of the boss 226 so that vibration of the mold is interrupted.

Just before the mix box starts its return movement rotation of the cam shaft 34 turns cam 37 against follower 52 on rocker arm 53 to rock the shaft 54 and swing the arm 56, and the sprockets 57 on the arms 53 and 56 rise to permit the head to be lowered by the chains 58 which are connected to the head at 61 and to anchorage points 61a on the side plates 2. The shape of the cam 37 is such that this lowering movement of the head takes place in two stages. During the first stage, which occurs before the mix box begins its rearward movement, the head descends just enough to bring the bottoms of the hold down feet into position to be cleaned by the wiper 15a which is secured to the front of the mix box, thus scraping any adhering material from the feet back into the mix box. The head remains motionless in this position, while the mix box is passing beneath it and the wiper 15a is cleaning it, due to engagement of the follower roller 52 with the slightly depressed dwell 37a of the cam 37. The second stage of the lowering movement of the head begins at the end of this dwell, after the mix box has cleared the head.

As the head approaches the mold, switch 225 is closed by boss 226 and immediately thereafter switch 228 is closed by boss 229 so that the mold and head vibrators start operating in quick succession. Promtply thereafter switch 221 is opened by boss 222 to stop the main motor 24 and apply the electric brake 25 so that rotation of the cam shaft 34 ceases. This of course stops all movements of the mix and pallet supplying parts and the machine is idle except that the head and mold are vibrating.

The vibrators 202 and 150 continue to vibrate until the set screw 231 descends with the head in its settling movement in the mold to engage and close the switch 230 to start the main motor 24 again in operation, thus causing the cam shaft 34 to resume rotation.

This causes the cam 36 on the shaft 34, which bears against follower roller 40, to swing rocker arm 41 down and its shaft 42 to swing arm 41a with the sprockets 44 on the arms 41 and 41a, meshed with the chains 45, which are connected to the anchors 48 on the mold and 48a on brackets secured to the side frame plates 2. Lowering the arms 41 and 41a operates on the chains 45 to raise the mold, the weight of which is partially counterbalanced by the counterweights 146.

As soon as the mold starts to rise, switch 228 is opened by boss 229 to stop vibrator 202, and immediately thereafter, when the mold has risen about a half inch, switch 225 is opened by boss 226 to stop vibrator 150.

As the rising mold clears the blocks, continued rotation of shaft 34 turns cam 37 against follower 52 on rocker arm 53 on shaft 54 to rock this shaft and swing the arms 53 and 56 downwardly with their sprockets 57 meshed with the chains 58, which are connected to the head at 61 and to the side frame plates 2 at 61a, to raise the head. Thus the head and mold now rise together. The cams 37 and 36 are so shaped and have such relative values that the head continues to rise after the mold stops rising, so that the head rises higher, through a longer path of movement, than the mold.

With the head and mold held above the top of the blocks, continued rotation of the shaft 34 turns the cam 39 against follower 70 on arm 71 on shaft 72 to rock this shaft and swing the arm 74 upwardly. The free end of this arm carries a sprocket 75 meshed with chain 76 one end of which is anchored at 77 to the base plate 1 and the other end of which is anchored at 80 to the pallet feed carriage 18. Rising of the arm 74 has the effect of shortening the chain 76 to pull the pallet carriage 18 forward, overcoming the counterweight 85. Advance of the pallet carriage causes the dogs 169 to discharge the pallet 19, on which the blocks were formed, onto the shelf bars 176 and causes the shoulders at the front of the bars 168 to feed another pallet from the bottom of the stack 20 to a position 19 under the mold.

Advance of the pallet feed carriage takes place in two stages, due to provision of an appropriate dwell on the cam 39. In the first stage the dogs 169 are brought up into contact with the pallet 19 which is beneath the mold while the mold and head are being vibrated. Then advance of the carriage stops, due to the dwell on the cam 39, and is resumed gradually, picks up speed, and is brought slowly to a stop, due to gentle rises on the cam 39, so as to avoid jarring or shocking movements which might destroy the blocks.

Continued rotation of the shaft 34 causes cam 36, which bears against follower roller 40, to swing arm 41 up, and this rotates shaft 42 with its arm 41a so that the arms 41 and 41a both swing up. Their sprockets 44, meshed with the chains 45, release the mold, which descends to a position resting on the pallet 19 beneath it.

Continued rotation of the shaft 34 and cam 39 permits the arm 74 to swing down to allow the weight 85 to retract the pallet feed carriage 18. In its rearward movement the dogs 169 swing on their pivots and pass beneath the pallet 19 which is beneath the mold and held down thereby. The pusher bars 168 pass beneath the pallet stack 20, and when the carriage is fully retracted the stack drops down to the pallet table 17 with the bottommost pallet of the stack in front of the shoulder at the front edge of the bars 168.

Thus the parts are all restored to their positions at the beginning of the explained cycle of operation, and the cycle is ready to be repeated, automatically and without interruption.

Referring again to Fig. 17, it will be noted that the vibrating means 150 for the mold and 202 for the head are energized each through its own switch and phase control boxes 250. Since the vibrators are connected to different pairs of the three-phase power supply line, they would normally vibrate at a phase displacement of 120° with respect to each other. However, by the use of reactances in the switch and phase control boxes 250 the energy applied to the vibrators is modified so that they vibrate in directly opposite phase. In no case is a vibrator energized unless single phase energy is applied to its control box 259 by limit switch 223 and manual switch 246, and limit switch 228 and manual switch 247, respectively.

The kinds of forces applied to the several main instrumentalities to move them through their various positions are interesting and have been chosen in order to obtain certain advantages. These forces are therefore thought worthy of brief reference, as follows:

The head assembly is raised by direct application of power but is lowered by gravity. Thus it is quickly elevated, but it settles down on the compacting mix without the imposition of any great, violent or sudden force, so that the compacting proceeds progressively and continues until completed by reducing the height of the mix to the predetermined dimension for which the set screw 231 is adjusted.

The mix box is retracted by direct application of power but is moved forward by the gravity of its counterweight. This latter force is a yielding one that will be overcome by any obstruction that may accidentally be interposed in the path of the box. Thus damage to the machine is avoided. The box simply stalls in some intermediate, partially advanced position, with its counterweight held up, until the operator can stop the entire machine and remove the obstruction.

In other words, the counterweight 106 and its chain 102 comprise an energy-storing means which becomes conditioned on withdrawal of the mix box by having stored in it the energy of the raised weight, which is of course a predetermined, limited quantity of energy that becomes released as the sole force acting to advance the mix box when the follower roller 90 drops to the low part of the cam 38.

The mold is raised by power but lowered by its own weight when the cam 36 permits the rocker arm 41 to rise. Thus positive, quick stripping is assured because the raising power is ample to overcome even the most tenacious bonding tendency of the mold to the casting (which is held down by the feet of the head assembly), and the small force required for free lowering is well provided by the weight of the mold, controlled by the shape of the cam 36 to prevent too great an impact on the pallet 19 which forms the bottom of the mold cavity.

The pallets are fed by power applied by the cam 39 and transmitted through the chain 76, so that the presence of a pallet beneath the mold will be assured. The pallet feed carriage is retracted by the pull of the counterweight 85 on the chain 82, which is ample for this purpose.

It is worth noting also that the agitating arms 136 in the mix box are powered by an independent motor 118 rather than by any connection with the main drive of the machine. The selected arrangement is simple and convenient, since the motor 118 is virtually mounted on the mix box, moves with it, and is readily controlled by simply causing the switch 223 to open and close by appropriately forming the boss 224 on the main driving gear wheel 33.

A further interesting feature of the machine is the fact that it completes one cycle of operation during each complete revolution of the gear wheel 33. This facilitates setting the several switches and bosses which are operated by this wheel, as well as arranging the cams which are driven by it. It will be appreciated of course from what has been hereinabove explained that the cycle is continuous and repeated except that it is interrupted at one stage only while the vibrating head is descending to that level in the mold which is predetermined by the height of the blocks desired and fixed by the position of the set screw 231.

Other and further features and advantages of the machine will, it is believed, be evident to those skilled in the art from a study of foregoing disclosure.

It remains to add only that the machine has been built and operated with complete satisfaction, rapidly and continually producing perfectly formed blocks as long as it was kept supplied with mix in the hopper 3 and with pallets introduced through one or the other of the side openings 17a.

I claim:

1. A building block molding machine comprising a mold, a hold down head engageable with a charge in the mold, electrical vibrating means operatively connected to the head and electrical vibrating means operatively connected to the mold, both operable during such engagement to vibrate the head and the mold at the same frequency and being operatively connected to the same source of electrical current to vibrate in opposite phase, the mold and head being thereby moved toward each other simultaneously and away from each other simultaneously.

2. A building block molding machine comprising a mold, a mix box reciprocating through a horizontal path to an advanced position for supplying a charge of mix to the mold and to a retracted position for another charge, a head vertically movable to a position engaged with the charge in the mold for compacting it and to an elevated position to make way for advance of the mix box, a wiper movable with the mix box for engaging the face of the head to clean said face of adhering particles of mix and wipe the same into the mix box, and means elevating the head beyond engagement by the wiper when the mix box advances toward the mold and lowering the head to a stationary position to be engaged by the wiper solely during retraction of the mix box from the mold.

3. A building block molding machine comprising a mold having an open bottom, a mix box for receiving a charge of mix from a source of supply which discharges into the mix box at a point spaced lengthwise of the machine from the location of the mold, means for feeding a pallet horizontally to close the bottom of the mold, means for advancing the mix box from a point beneath the source to a point over the mold and for thereafter retracting the mix box, said last-named means including a counterweight connected to the mix box and adapted to be elevated when the mix box is retracted to charge-receiving position beneath the source and to act solely by its weight in pulling the mix box to a position over the mold, and said pallet-feeding means comprising a reciprocating carriage and a counterweight connected thereto and common drive means for positively retracting the mix box and positively advancing the carriage with a pallet thereon to the mold, thereby simultaneously elevating the last named counterweight so that the carriage is thereafter urged to retracted position solely by the weight of said counterweight in descending.

4. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn, the combination of a wiper for the head, drive means for advancing and withdrawing the mix box, control means operative to lower the head toward the mold, said control means being operative to stop the head in a partially lowered position and thereafter to move the head to a fully lowered position in engagement with the charge in the mold, and means for causing the wiper to wipe the head when the head is stopped in partially lowered position.

5. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn, the combination of a wiper for the head carried by the forward end portion of the mix box, drive means for advancing and withdrawing the mix box, and control means operative to lower the head toward the mold, said control means being operative to stop the head in a partially lowered position before the mix box moves to withdrawn position, whereby the wiper will wipe the head during withdrawal of the mix box, and said control means being operative thereafter to move the head to fully lowered position in engagement with the charge in the mold.

6. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn, the combination of energy-storing means operatively connected to the mix box to receive and store energy on withdrawal of the mix box, positive drive means for withdrawing the mix box and simultaneously conditioning the energy-storing means to store a predetermined limited quantity of energy therein, means for thereafter acting on the energy-storing means to release said quantity of energy to advance the mix box, and control means operative to lower the head into engagement with the charge in the mold after the mix box is withdrawn and to hold the head in such engagement until the charge becomes compacted to a predetermined height in the mold and operative thereafter, in response to the charge becoming compacted to said predetermined height, to raise the head.

7. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn, the combination of a wiper for the head, drive means for advancing and withdrawing the mix box, control means operative to lower the head toward the mold, said control means being operative to stop the head in a partially lowered position and thereafter to move the head to a fully lowered position in engagement with the charge in the mold, and means for causing the wiper to wipe the head when the head is stopped in partially lowered position, said control means being operative to hold the head in engagement with the charge in the mold until the charge becomes compacted to a predetermined height in the mold and operative thereafter, in response to the charge becoming compacted to said predetermined height, to raise the head.

8. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn, the combination of counterweight means for advancing the mix box, positive drive means for withdrawing it, means for vibrating the mold while the mix box is withdrawn, and control means operative to lower the head into engagement with the charge in the mold after the mix box is withdrawn and to hold the head in such engagement during vibration of the mold until the charge becomes compacted by said vibration to a predetermined height in the mold and operative thereafter, in response to the charge becoming compacted to said predetermined height, to raise the head.

9. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn while the charge in the mold is vibrated, the combination of drive means for the head and mix box comprising positive drive means for raising the head for release to be lowered by gravity and counterweight means for advancing the mix box and positive drive means for withdrawing it, and control means for governing the movements of the head and mix box and the vibration including a rotary element adapted on each complete rotation to cause the machine to operate through one complete cycle and produce a molded block, said control means comprising also switch means operative to stop the drive means when the head becomes lowered onto the charge in the mold and during subsequent vibration of the charge in the mold and operative to start the drive means and cause the head to be raised solely in response to the head becoming lowered to a position in which the charge in the mold has been compacted by said vibration to a predetermined height in the mold.

10. In a building block molding machine of the class wherein a head is initially elevated above a mold and is movable down into engagement with a charge in the mold after a mix box advances from a source of supply of mix to a position above the mold and drops a charge of mix into the mold and thereafter is withdrawn while the charge in the mold is vibrated, the combination of a wiper for the head, drive means for the head and mix box, and control means for governing the movements of the head and mix box and the vibration including a rotary element adapted on each complete rotation to cause the machine to operate through one complete cycle and produce a molded block, said control means being operative to halt the head during its lowering movement and simultaneously to move the wiper across the face of the head comprising also switch means operative to stop the drive means when the head becomes lowered onto the charge in the mold and during subsequent vibration of the charge in the mold and operative to start the drive means and cause the head to be raised solely in response to the head becoming lowered to a position in which the charge in the mold has been compacted by said vibration to a predetermined height in the mold.

11. The combination claimed in claim 10, in which the wiper is carried by the forward end portion of the mix box.

MILLARD R. WARREN.

References Cited in the file of this patent

UNITED STATES PATENTS

| Number | Name | Date |
|---|---|---|
| 500,510 | Rice | June 27, 1893 |
| 789,129 | Rider | May 2, 1905 |
| 876,388 | Nieters | Jan. 14, 1908 |
| 1,695,327 | Goldston | Dec. 18, 1928 |
| 1,751,028 | Caswell et al. | Mar. 18, 1930 |
| 1,796,636 | Toulmin | Mar. 17, 1931 |
| 1,905,975 | Thomas | Apr. 25, 1933 |
| 1,919,807 | Sharpe | July 25, 1933 |
| 2,036,367 | Shinn et al. | Apr. 7, 1936 |
| 2,270,829 | Wellnitz | Jan. 20, 1942 |
| 2,308,132 | Wellnitz | Jan. 12, 1943 |
| 2,341,012 | Billman et al. | Feb. 8, 1944 |
| 2,407,168 | Lindkvist | Sept. 3, 1946 |
| 2,431,034 | Gelbman | Nov. 18, 1947 |
| 2,446,061 | Reed | July 27, 1948 |
| 2,464,641 | Hearn | Mar. 15, 1949 |
| 2,467,203 | Gelbman | Apr. 12, 1949 |
| 2,513,028 | Lagarde | June 27, 1950 |